United States Patent

[11] 3,604,554

[72] Inventor Robert L. Martz
 Grandview, Mo.
[21] Appl. No. 4,869
[22] Filed Jan. 22, 1970
[45] Patented Sept. 14, 1971
[73] Assignee Gordon Johnson Company
 Kansas City, Mo.

[54] TRAY-SPACING CONVEYOR
 18 Claims, 6 Drawing Figs.

[52] U.S. Cl. .................................................... 198/183
[51] Int. Cl. .................................................... B65g 39/20
[50] Field of Search .......................................... 198/127,
 183, 160

[56] References Cited
 UNITED STATES PATENTS
 3,373,860 3/1965 Lindgren et al. ............... 198/183 X FOREIGN PATENTS
881,250 11/1961 Great Britain ............... 198/183

Primary Examiner—Harvey C. Hornsby
Assistant Examiner—H. S. Lane
Attorney—Schmidt, Johnson, Hovey & Williams ABSTRACT: An article transfer apparatus has a conveyor provided with rotatable, article-supporting rollers. Movable article-spacing devices used in conjunction with the conveyor have stops, normally held down by gravity, and depressors, which are lowered and held down by an article resting thereon to raise the corresponding stops into the path of the articles. Accelerator pad means engaged by the rollers rotate the latter to augment advancement by the articles.

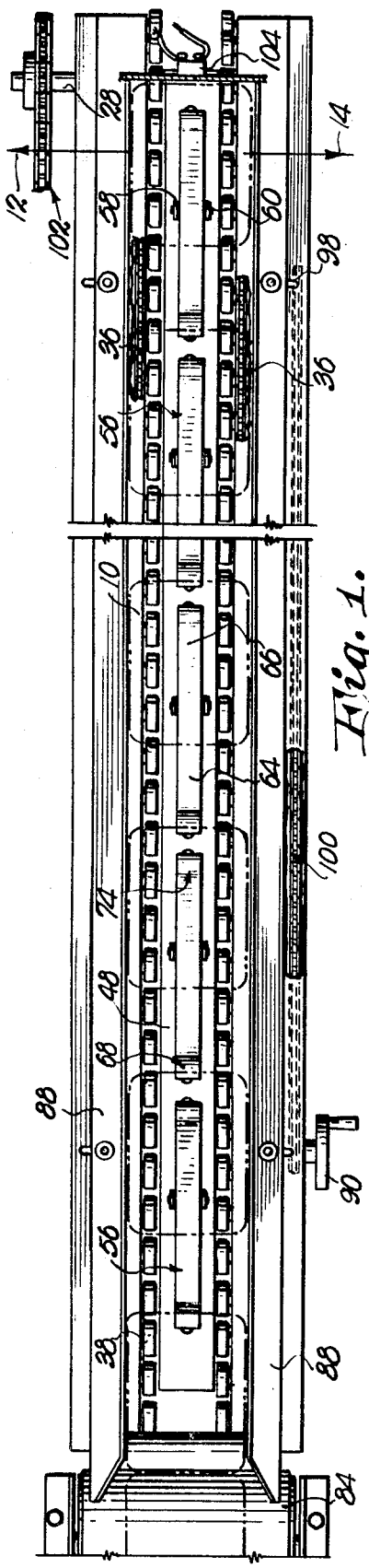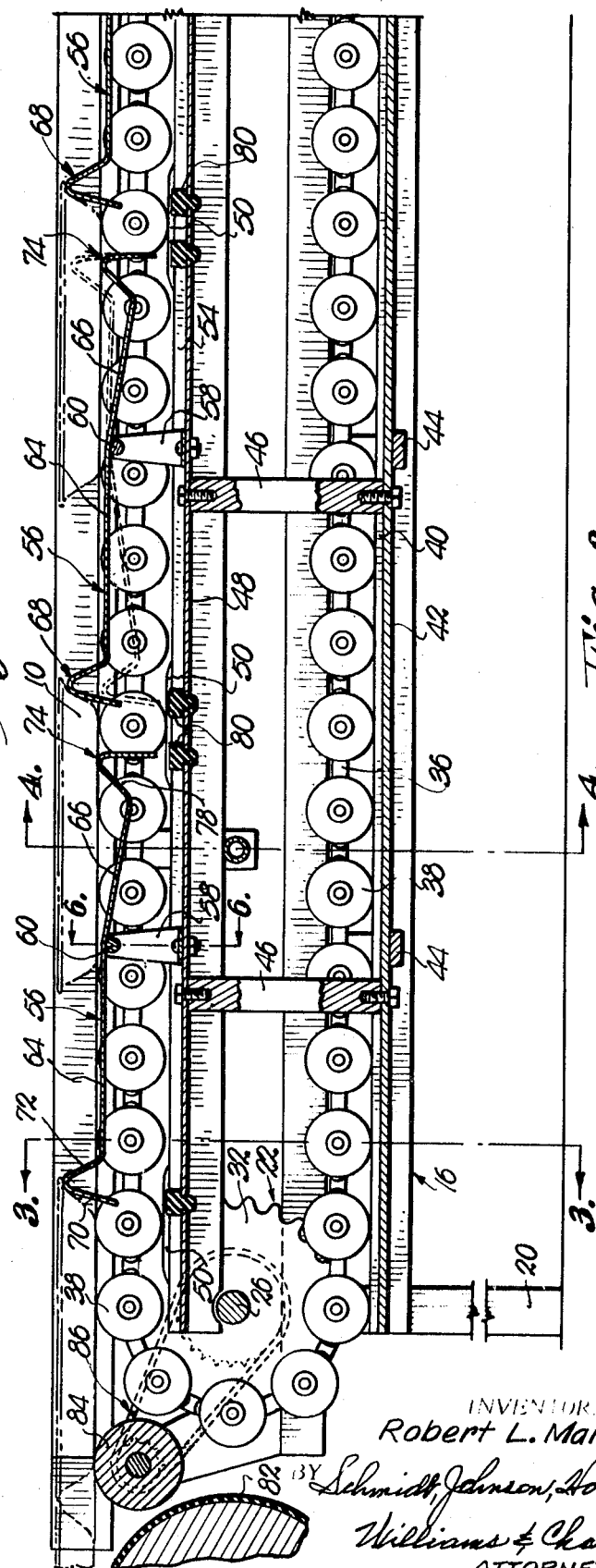

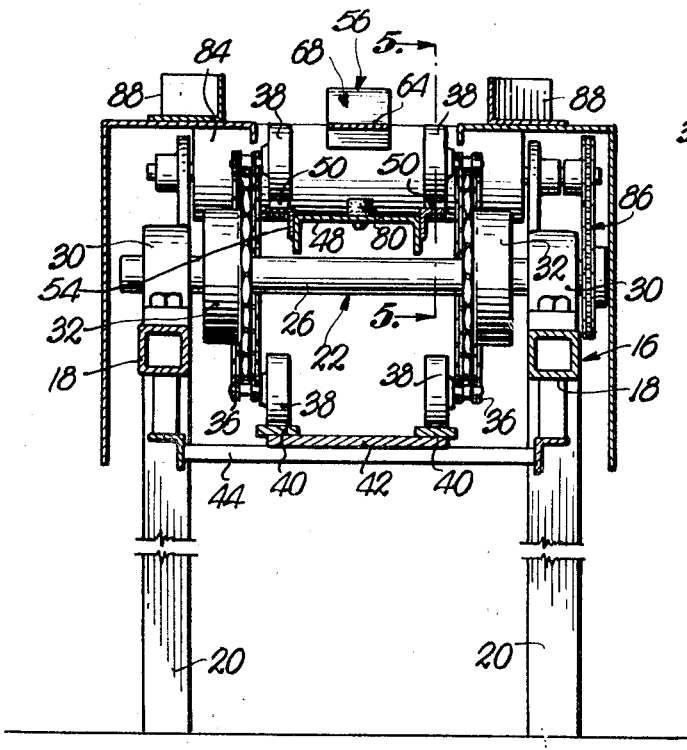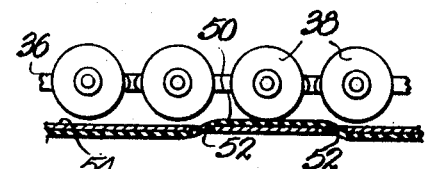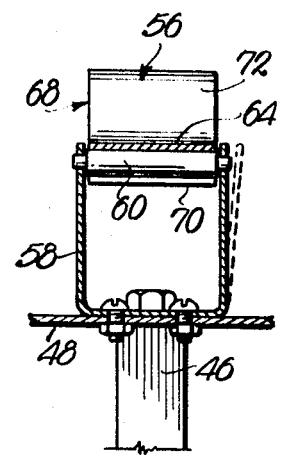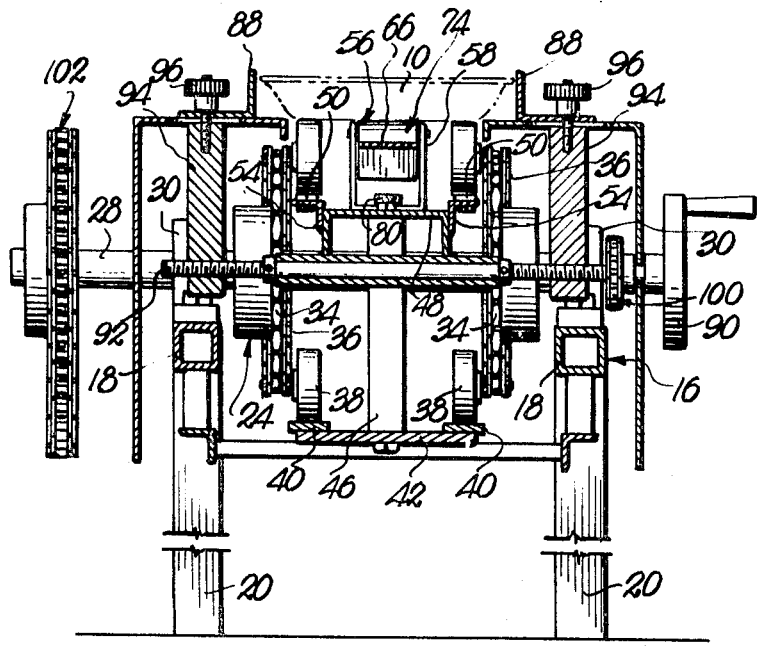

TRAY-SPACING CONVEYOR

It is the primary object of my present invention to advance articles along a predetermined path of travel and provide for structure to cause movement of the articles toward the discharge end of a conveyor at a uniform rate regardless of the rate at which the articles are fed to or removed from the conveyor.

The most important object of the instant invention is to hold the articles equally spaced on the conveyor as the latter continues to operate even if the mechanism for removing the articles from the conveyor at its discharge end is capable of such removal faster than the articles are delivered to the conveyor.

Another important object of the present invention is to provide rollers on the conveyor which normally rotate freely and are driven only at such times and to such extent as may be needed or desired through use of simple friction devices.

Still another important object of my instant invention is to provide an accelerator means for periodically augmenting the normal article advancing action of the conveyor.

In the drawings:

FIG. 1 is a top plan view of a tray spacing conveyor made pursuant to my present invention;

FIG. 2 is an enlarged, fragmentary, vertical cross-sectional view taken longitudinally through the apparatus;

FIGS. 3 and 4 are cross-sectional views taken on lines 3—3 and 4—4 respectively of FIG. 2;

FIG. 5 is a fragmentary, detailed, cross-sectional view taken on line 5—5 of FIG. 3; and FIG. 6 is a fragmentary, detailed, cross-sectional view still further enlarged taken on line 6—6 of FIG. 2.

The articles chosen for illustration of the concepts of the transfer apparatus about to be described are in the nature of relatively shallow polygonal trays 10, it being understood, however, that the use of the word tray herein does not in any sense preclude the use of the apparatus in connection with many other types of transportable articles. Moreover, the apparatus is especially adapted for use in connection with structure (not shown) for shifting the trays 10 laterally one at a time at the discharge end of the apparatus in one direction or with alternate trays 10 shifted laterally in opposite directions as indicated by the arrows in FIG. 1 designated by the numerals 12 and 14. This does not preclude, however, the mere delivery of the articles 10 at the discharge end of the apparatus without any lateral unloading of the trays 10 from the apparatus.

Supporting framework broadly designated by the numeral 16 includes a pair of laterally spaced, elongated, longitudinally extending beams 18 provided with legs 20, the beams 18 supporting a pair of horizontally spaced carriers 22 and 24 for rotation about horizontal axes. Carriers 22 and 24 have transverse shafts 26 and 28 respectively rotatable in bearings 30 that are attached to the beams 18, the shaft 26 being provided with a pair of horizontally spaced sprocket wheels 32, and the shaft 28 being provided with a corresponding pair of horizontally spaced sprocket wheels 34.

A pair of endless, flexible conveyors trained about the sprocket wheels 32 and 34 of the carriers 22 and 24 are each in the nature of a continuous chain 36, with each chain 36 provided with a continuous series of article-supporting rollers 38 movable therewith and freely rotatable about horizontal axes that are parallel with the axes of rotation of the carriers 22 and 24 within the bearings 30.

The rollers 38 along the lower stretch of the chains 36 are supported by tracks 40 on a shelf 42 which is in turn supported by crossbars 44 depending from the beams 18.

A plurality of posts 46 on the shelf 42 support a longitudinally extending frame channel 48 above the shafts 26 and 28 but spaced below the rollers 38 of the upper stretches of chains 36. Channel 48 is provided with a pair of longitudinally extending angle irons 54 as shown in FIGS. 3 and 4. Each angle iron 54 carries a number of spaced accelerators 50 in the nature of friction pads that are threaded through openings 52 for placing the accelerator pads 50 in a position for engagement by rollers 38 to cause the latter to rotate while in engagement with the pads 50, it being understood, therefore, that there is a row of pads 50 corresponding to each chain 36 respectively.

A row of elongated, article-spacing devices 56, extending from carrier 22 to carrier 24 are mounted on the channel 48 through the medium of pedestals 58. The upstanding legs of the U-shaped pedestals 58 may be spread apart as illustrated in FIG. 6 for reception of horizontal pivot pins 60 about which the devices 56 swing during advancement of the trays 10 by the upper stretches of the chains 36 from carrier 22 to carrier 24. The elongated, flat plates from which the devices 56 are made are secured at their lower surfaces to the pins 60, and the devices 56 are divided into a pair of angularly offset sections 64 and 66 extending in opposite directions from the pins 60 such that the section 66 slopes downwardly as shown in FIG. 2 when the section 64 is horizontally disposed.

The section 64 of each device 56 has an integral, upstanding generally V-shaped stop 68, presenting a pair of inclined ramps 70 and 72, the former of which is in the nature of a flange depending from the bight of the stop 68. In a similar manner, the section 66 of each device 56 has an integral, upstanding generally V-shaped depressor 74 having inclined ramps 76 and 78, the ramp 76 being in the nature of a terminal flange depending from the bight of the depressor 74. Bumpers 80 carried by the channel 48 are disposed for engagement by the lowermost terminal edges of the flangelike ramps 70 and 76.

The trays 10 may be fed to the rollers 38 by a belt conveyor 82 and by a roller 84 carried by the framework 16 and driven from the shaft 26 by chain and sprocket means 86.

Trays 10 are fed between a pair of guides 88 which may be moved toward and away from each other so as to accommodate articles of differing widths by manipulation of a handwheel 90. This rotates a shaft 92 having left- and right-hand threads at opposite ends thereof threaded into longitudinal bars 94 which carry the guides 88 by means of releasable fasteners 96. Shaft 92 as well as an additional shaft 98 (FIG. 1) (also operably coupled with bars 94) are interconnected by chain and sprocket means 100. Thus both ends of both of the bars 94 are simultaneously shifted toward or away from each other upon rotation of the handwheel 90. The shaft 28 of the carrier 24 is driven by chain and sprocket means 102.

In operation, the trays 10 are successively fed to the upper rollers 38 by the conveyor 82 and the roller 84 between the guides 88 without any predetermined spaced relationship between the trays 10 on the conveyor 82.

When such feeding commences, all of the spacing devices 56 are disposed with their stops 68 below the path of the trays 10 by action of gravity because of the fact that the section 64 is longer than the section 66 whereby to present a weight differential between such sections and thereby yieldably biasing the devices 56 in a counterclockwise direction, viewing FIG. 2.

Consequently the leading tray 10 will be accelerated by the roller 84 with sufficient velocity to assure continued advancement by the rollers 38. The rollers 38 will successively engage the first friction pad 50 adjacent the shaft 26, causing such rollers 38 to rotate momentarily and accelerate the advancement of the trays 10.

As soon as the leading tray 10 encounters the upstanding depressor 74 it will slide along the ramp 78 of such depressor 74, shifting the latter downwardly and raising the first stop 68 to preclude advancement of the next succeeding tray 10.

The succeeding friction pads 50 are located directly below the space between proximal stops 68 and depressors 74. Therefore, at about the time the tray 10 crosses over the bight of the depressor 74 its advancement is accelerated by the rollers 38 traveling across the underlying pad 50.

As soon as the leading tray 10 clears the depressor 74, the first device 56 automatically swings counterclockwise, lowering the first stop 68 and clearing the next succeeding tray 10 for advancement by the rollers 38 along the upper stretches of the chain 36.

Such action continues throughout the length of the apparatus, causing all of the trays 10 to be equally spaced, and therefore equally or uniformly delivered toward the discharge end of the apparatus at the carrier 24.

The unloading mechanism indicated by the arrows 12 and 14 must remove the leading tray 10 before tray advancement continues. As long as the leading tray 10 remains on the last depressor 74, all of the spacers 56 remain tilted clockwise, causing their stops 68 to retard the trays 10 regardless of continuous advancement of the chains 36, the roller 84 and the belt 82. Unloading mechanism 12, 14 will not operate unless a switch 104 is engaged by the leading tray 10.

It is to be understood that the number of accelerator pads 50 and the spacing therebetween may be varied, but it has been found that under certain conditions their best performance is to accelerate advancement of the trays 10 while they pass over the uppermost arcuate bights of the V-shaped depressors 74; hence, the location of the pads 50 in the manner illustrated by FIG. 2. At all other times the rollers 38 merely advance with the uppermost stretches of the chain 36 without rotation while in engagement with the bottoms of the trays 10.

On the other hand, it has been found that the rate of advancement of the trays 10 can be increased by shifting the pads 50 such that they underlie the stops 68 only, in which event the rollers 38 rotate freely in an anticlockwise direction while in engagement with a tray 10 that is held against advancement by a stop 68.

Ideally the rate of delivery of the articles 10 by the conveyor 82 to the roller 84 should be equal to the rate of removal by the mechanism 12, 14, but if the input at roller 84 is too slow, such is of little consequence because of the fact that mechanism 12, 14 is controlled by switch 104.

If the articles 10 are fed too fast by the conveyor 82, i.e., faster than the rate of takeoff by mechanism 12, 14, the articles 10 will ultimately commence pushing each other at the roller 84, whereupon the feeding rate should be decreased. The time that it takes for the trays 10 to thus build up and abut at roller 84 depends on the lengths of the chains 36, their speed of advancement, the size and weights of the trays 10 as well as the frictional characteristics of the material from which they are made, the number, lengths and positioning of the pads 50, and of course, the differential in he rate of feed and removal of the trays 10. These, and other matters must be considered and can easily be varied as differing conditions dictate. The form of the invention as shown and described is, therefore, illustrative only and not intended to be limited to critical factors.

Having thus described the invention, what is claimed as new and desired to be secured by Letters Patent is:

1. Article transfer apparatus comprising:
    a supporting framework;
    a pair of horizontally spaced carriers mounted on said framework for rotation about horizontal axes;
    an endless, flexible conveyor trained about said carriers, presenting an elongated, uppermost, article-supporting stretch movable continuously from one of said carriers to the other of said carriers;
    a row of elongated, article-spacing devices extending from said one carrier to said other carrier along said stretch;
    pivot means for each device respectively swingably mounting the same on said framework for movement about a horizontal axis traversing the device intermediate its ends,
    the axes of swinging movement of said devices being parallel with said axes of rotation of said carriers;
    an article stop on the leading end of each device respectively;
    a depressor on the trailing end of each device respectively; and
    means for each device respectively yieldably biasing the same in one direction of swinging movement thereof, placing the depressors in a normal position within the path of travel of the articles on said stretch and placing the stops in a normal position below said path of travel of the articles, whereby the stops are raised to hold the articles against advancement by said stretch when their corresponding depressors are held down by an article thereon.

2. Article transfer apparatus as claimed in claim 1 wherein said stops and said depressors comprise upwardly extending, generally V-shaped elements, presenting inclined, article-engaging ramps.

3. Article transfer apparatus as claimed in claim 1 wherein is provided bumpers on said framework disposed for engagement by the stops and by the depressors on the down stroke thereof.

4. Article transfer apparatus as claimed in claim 1 wherein each device has a pair of sections extending in opposite directions from its axis of swinging movement, one of said sections having the stop thereon being heavier than the other of said sections having the depressor thereon whereby said means for yieldably biasing the devices in said one direction comprises the weight differential between said sections, 5. Article transfer apparatus as claimed in claim 4 wherein said one section is longer than said other section, presenting said weight differential therebetween.

6. Article transfer apparatus as claimed in claim 1 wherein each device has a pair of angularly offset sections extending in opposite directions from its axis of swinging movement, presenting a downwardly facing, acute angle between the sections at said axis of swinging movement of the device.

7. Article transfer apparatus as claimed in claim 6, wherein each device includes an elongated, flat plate, and wherein said stops and said depressors comprise upwardly extending, generally V-shaped elements terminating in inclined, downwardly extending flanges.

8. Article transfer apparatus as claimed in claim 1 wherein each device includes an elongated, flat plate, and wherein said stops and said depressors comprise upwardly extending, generally V-shaped elements terminating in inclined, downwardly extending flanges.

9. Article transfer apparatus as claimed in claim 8 wherein is provided bumpers on said framework disposed for engatement by the lowermost ends of said flanges on the downstroke of the latter.

10. Article transfer apparatus as claimed in claim 1 wherein said conveyor is provided with a continuous series of article-supporting rollers movable therewith and freely rotatable about horizontal axes parallel with said axes of rotation of said carriers.

11. Article transfer apparatus as claimed in claim 10 wherein is provided a pair of laterally spaced, article guides on said framework along said stretch and parallel therewith for holding the articles on said series of rollers.

12. Article transfer apparatus as claimed in claim 11 wherein said guides are shiftable toward and away from each other and means is provided for holding them in any one of a number of adjusted positions.

13. Article transfer apparatus as claimed in claim 10 wherein is provided a number of accelerators mounted on said framework, spaced along said stretch, and disposed for engagement with said rollers as they travel from said one carrier to said other carrier for rotating the rollers.

14. Article transfer apparatus as claimed in claim 13 wherein each depressor is spaced rearwardly from the next succeeding stop, and wherein the accelerators are in underlying relation to the spaces between the stops and the depressors.

15. Article transfer apparatus as claimed in claim 14 wherein said accelerators comprise friction pads underlying said stretch.

16. Article transfer apparatus as claimed in claim 13 wherein said accelerators comprise friction pads underlying said stretch.

17. Article transfer apparatus as claimed in claim 16 wherein each device includes an elongated, flat plate, each plate having a pair of sections extending in opposite directions from its axis of swinging movement, one of said sections having the stop thereon being heavier than the other of said sections having the depressor thereon whereby said means for yieldably biasing the devices in said one direction comprises the weight differential between said sections.

18. Article transfer apparatus as claimed in claim 17 wherein said one section is longer than said other section, presenting said weight differential therebetween.